Patented June 9, 1936

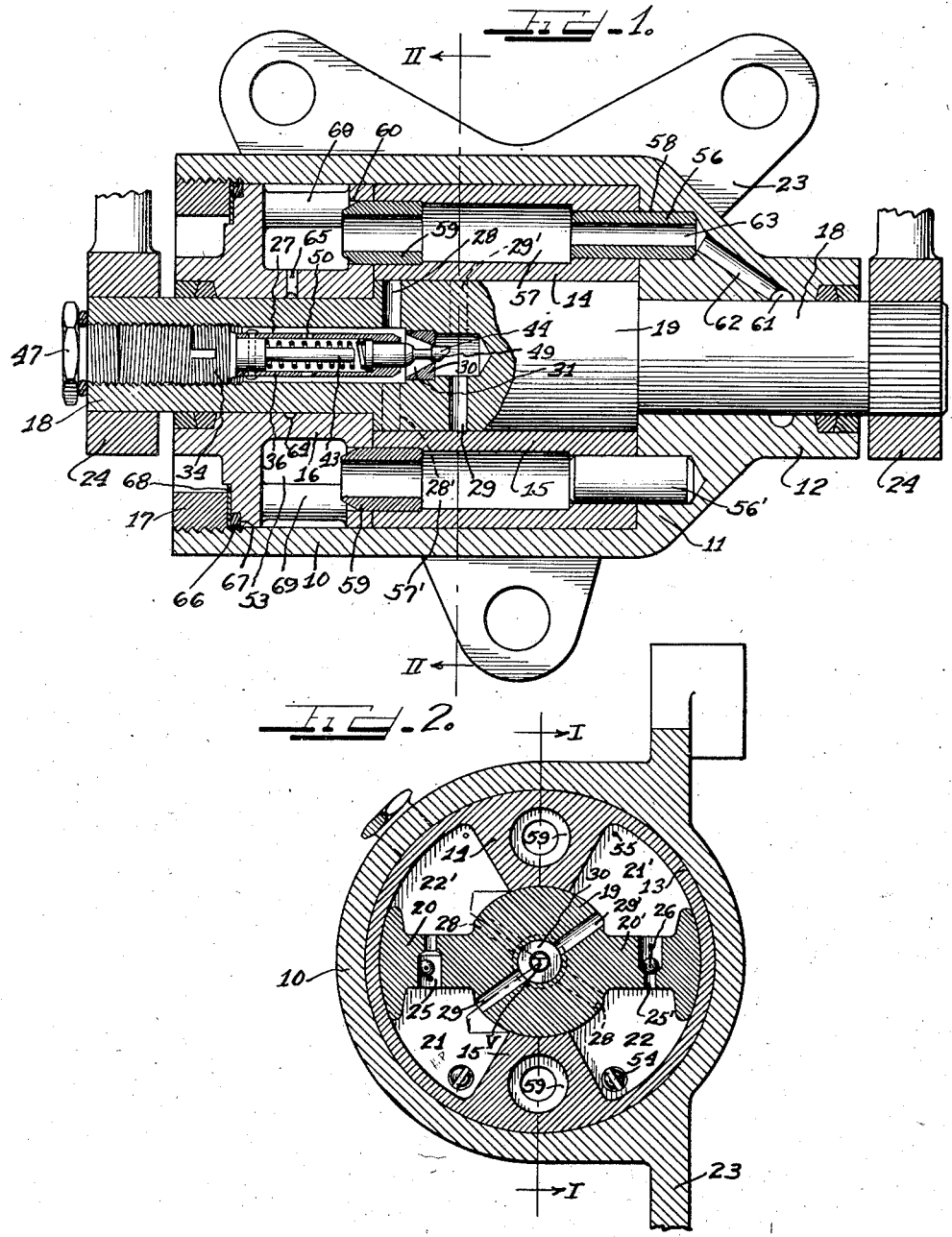

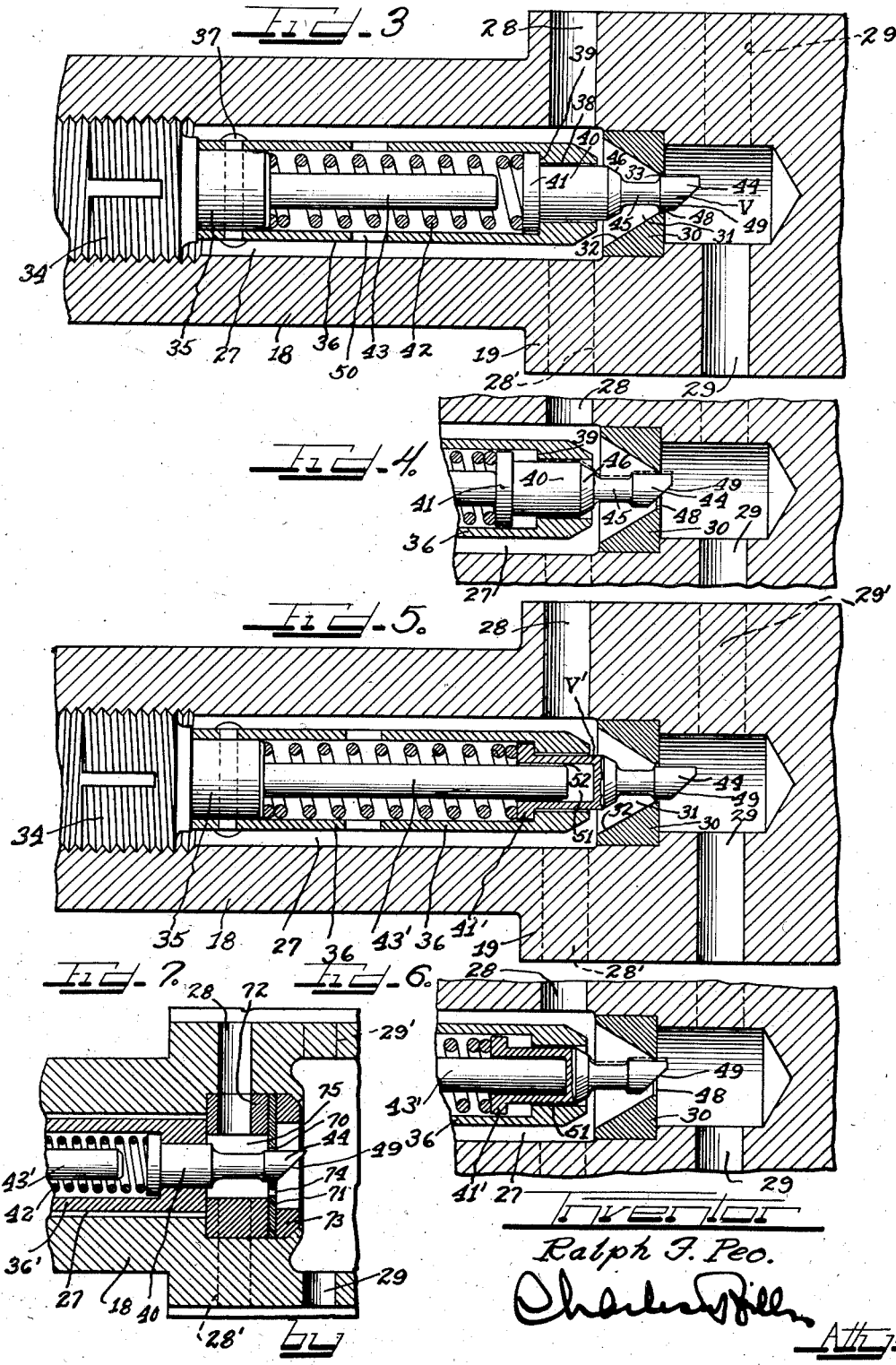

2,043,489

UNITED STATES PATENT OFFICE 2,043,489

HYDRAULIC SHOCK ABSORBER

Ralph F. Peo, Buffalo, N. Y., assignor to Houde Engineering Corporation, Buffalo, N. Y., a corporation of New York Application September 22, 1934, Serial No. 745,047

1 Claim. (Cl. 188—100)

This invention relates to hydraulic shock absorbers adapted particularly for use on automotive vehicles for controlling the operation of the vehicle springs.

An important object of the invention is to provide improved valving arrangement for more efficiently controlling the flow of the displaced hydraulic fluid to compensate for variations in the viscosity of the fluid and particularly for increasing the capacity of the fluid passageway during the time when the fluid is very cold and correspondingly viscid.

A further object is to provide valve structures which will yield to gradually but adequately increase the capacity of the fluid passageway when the fluid is subjected to excessive pressure due to sudden rapid and powerful movement of the piston or during rapid movement of the piston when the fluid is cold and correspondingly viscous.

Another important object is to provide a valving arrangement which will eliminate vibration or chattering of the movable flow controlling valve member when subjected to the pressure and pulsation of the fluid flow through the port or passage controlled by the valve.

A further important object is to provide valving arrangement in which a movable valve member is hydraulically cushioned so as to prevent sudden impacts thereof against stop members and to prevent noisy operation.

The features specifically referred to and other important features of the invention are shown incorporated in the structures disclosed on the drawings, in which drawings:

Figure 1 is a diametral section of a shock absorber on plane I—I of Figure 2;

Figure 2 is a transverse section on plane II—II of Figure 1;

Figure 3 is an enlarged view partly in section of the piston structure and the valving assembly therein showing the valve in normal position;

Figure 4 is a view similar to Figure 3 showing the position of the valve under excessive pressure;

Figure 5 is a view similar to Figure 4 showing a modified valve construction and with the valve in normal position;

Figure 6 is a view similar to Figure 5 showing the position of the valve under excessive fluid pressure, and Figure 7 is a view similar to Figure 3 showing another modified arrangement.

The housing of the shock absorber comprises the annular cylindrical wall 10 having the end wall 11 integral therewith, said end wall having a bearing flange 12 extending therefrom. Seated in the wall 10 and against the end wall 11 is the ring 13 which has the partition lugs 14 and 15 extending radially inwardly therefrom toward opposite sides.

A movable end wall structure 16 fits into the open end of the annular wall 10 and abuts against the ring 13 and the partition lugs 14 and 15. The wall structure is securely held in position by the annular nut 17 threading into the end of the wall 10. The wall structure 16 is bored to form a bearing for one end of the shaft 18 whose other end is journalled in the bearing extension 12 of the wall 11. Between the walls 11 and 16 the shaft is of enlarged diameter to form a hub 19 from which extend piston vanes 20 and 20', these vanes engaging at their other end with the inner surface of the ring 13 between the partition lugs. The piston structure and the lugs divide the space within the ring 13 into high pressure working chambers 21 and 21', and low pressure working chambers 22 and 22'.

The shock absorber body has a suitable supporting base 23 by which it may be secured to a support, as for example, the chassis frame of an automotive vehicle. The lever structure 24 is secured to the ends of the shaft 18 and connected, usually with the axle of the automotive vehicle, so that during compression and rebound of the vehicle springs, the shaft will be oscillated and the piston vanes 20 and 20' correspondingly oscillated in the working chambers between the partition lugs for displacement of the fluid in said chambers.

The hydraulic flow of shock absorbing resistance during compression movement of the vehicle spring is controlled by the restricted passages 25 and 25' through the piston vanes 20 and 20', each of these passages being closed by a check valve such as a ball 26 during the rebound movement of the vehicle spring.

I have provided improved valving structure and arrangement for metering and controlling the fluid flow and shock absorber resistance during rebound movement of the vehicle spring. The valving assembly is arranged within the bore 27 extending axially in one end of the shaft 18. This bore is connected with the low pressure chambers 22 and 22' by ports or passages 28 and 28' extending radially through the piston hub 19, while the high pressure working chambers 21 and 21' are connected with the inner end of the bore 27 by ports or passages 29 and 29' respectively.

Between the low pressure passages 28 and 28' and the high pressure passages 29 and 29' a bushing or valve seat 30 is interposed and is secured in the shaft bore 27. The bushing has the frusto-conical or flaring bore 31 presenting a conical seating surface 32 at the low pressure side of the bushing, the bore at its apex being finished to leave a narrow cylindrical surface or orifice surrounding edge 33 at the high pressure side of the bushing.

The outer part of the bore 27 is threaded to receive a supporting head 34 having the neck 35 on its inner end for receiving the outer end of a tube 36, the tube being secured to the neck as by means of a cross pin 37. At its inner end the tube 36 is of reduced internal diameter to provide the cylindrical guideway or bore 38 and a shoulder 39. The guideway 38 receives the cylindrical body 40 of a movable valve structure V which at its outer end has the flange 41 for seating against the shoulder 39, a spring 42 extending between the flange and the neck 35 of the supporting member 34, this spring tending to hold the valve structure in its normal position with the flange 41 seated against the shoulder 39. In the arrangement of Figures 1 to 4, the valve structure is solid and its inward movement in the bore 38 is limited by the engagement of its inner flanged end 41 with a stop pin 43 extending from the supporting member 34 through the spring, this stop pin as shown being secured by the pin 37 which holds the tube 36 to the neck 35.

At the outer end of the valve structure is the cylindrical valve plug 44 connected with the valve body 40 by the reduced portion or stem 45. The outer end of the body 40 has the frusto-conical section 46 whose conical surface is parallel with the bushing surface 32. In the normal position of the valve structure, as shown in Figure 3, the valve structure seats with its flange 41 against the seat 39, and with the inner end of the plug 44 within the apex of the bushing bore 31 and surrounded by the orifice surface 33, the conical seat 46 on the valve body being displaced from the bushing surface 32. This surface 46 serves as a convenient means for primarily adjusting the valve structure to its normal position. To accomplish such adjustment or setting the supporting member or head 34 is screwed into the shaft bore 27 until the valve surface 46 engages with the bushing surface 32. Then a predetermined number of back turns of the supporting head 34 will bring the valve plug 44 into the proper position in the bushing bore apex for normal operation of the shock absorber. After such setting of the valve structure a closure plug 47 is applied in the outer end of the shaft bore 27.

The diameter of the cylindrical valve plug 44 is less than the diameter of the orifice edge 33 so as to leave an annular orifice 48 of the desired cross section for metering the fluid flow from the high pressure working chambers to the low pressure chambers to thereby determine the shock absorber resistance to the vehicle spring rebound movement under normal pressure. As the displaced fluid flows from the high pressure chambers through the ports 29 and 29' into the inner end of the shaft bore 27 and from there through the annular orifice 48 and through the passages 28 and 28' to the low pressure working chambers, the fluid will exert axial pressure against the valve structure tending to shift it inwardly. However, the spring 42 is calibrated to resist such inward movement of the valve structure under ordinary pressure conditions. The pressure may, of course, increase throughout a certain range without becoming excessive and during such pressure variation the valve structure may be shifted inwardly against the resistance of the spring but there will be no change in the area or size of the annular orifice 48. In order to increase the flow area of the valve plug and decrease the flow resistance as the pressure becomes excessive, the outer end of the valve plug 44 is beveled or cut away on the bias to leave the beveled face 49. With this arrangement when the pressure becomes great enough the valve structure will be shifted inwardly against the resistance of the spring 42 and the beveled end of the valve plug will be moved inwardly through and beyond the orifice edge 33 to gradually increase the orifice or passage area for correspondingly increased flow of fluid to relieve the excessive pressure so as to protect the shock absorber structure against undue strain or damage.

The beveled end of the valve plug also serves another important purpose in that it introduces a lateral fluid pressure component which tends to hold the valve against vibrating or chattering. Without this lateral pressure component surface the pressure impulses against the valve structure in axial direction, and the flow impulses through the annular orifice and around the valve will tend to cause vibration or chattering of the valve and noisy operation. However, by providing the lateral pressure component, as by beveling the end of the valve plug as shown, the lateral pressure against the valve will tend to force it into engagement with one side of the orifice 48 against the orifice edge 33 and thus keep the valve from vibrating or chattering, as shown in Figure 4. Sufficient clearance is provided for the valve body 40 in the bore 38 to permit canting of the valve structure and holding thereof against the orifice edge by the fluid pressure. During the compression movement of the vehicle spring, most of the fluid flow from the low pressure working chambers will be through the passageways 26 and 26' in the piston vanes, and the portion of the fluid flow from the low pressure to the high pressure chambers by way of the orifice 48 will be comparatively small so that the force of the spring 42 against the valve structure will prevent vibration or chattering of the valve structure during such flow.

As the shaft bore 27 and the interior of the valve supporting tube 36 are at all times filled with fluid, suitable vents 50 are provided in the tube 36 to prevent the valve structure from becoming fluid locked.

In Figures 5 and 6 a modified arrangement is shown. The valve structure V' instead of being solid like the valve structure V in Figures 1 to 4, has its body 40' provided with the axial bore 51. This arrangement material reduces the weight of the valve structure and inertia resistance to movement of the valve structure by the spring and the fluid pressure.

The stop pin 43' is made of sufficient length to extend into the bore 51, a dash pot arrangement being thus provided. During operation of the shock absorber under normal pressure range the spring 42 holds the valve structure with its flange 41' against the shoulder 39, the bottom of the bore 51 being then displaced from the end of the stop pin 43'. The diameter of the pin 43' is sufficiently less than the diameter of the bore 51 to leave a restricted vent or air passage 52. As the valve structure is reciprocated axially under alternate application of fluid pressure and spring pressure, such reciprocating movements will not be abrupt but will be cushioned by the dash pot action of the pin 43' in the bore 51. This hydraulic cushioning will prevent hammer blow impact between the valve flange 41' and the shoulder 39 and between the valve body and the end of the stop pin, and noisy operation will therefore be prevented.

Except for the provision of the dash pot arrangement between the stop pin and the valve structure, the arrangement and operation in Figures 5 and 6 is the same as that in Figures 1 to 4, the heavy pressure flow from the high pressure chambers to the low pressure chambers exerting lateral pressure against the valve structure to hold it against the orifice edge and thereby prevent chattering or lateral vibration.

In referring to Figures 1 and 2, the end wall structure 16 is hollow to provide the annual replenishing chamber or reservoir 53 from which replenishing fluid flows to the working chambers through check valve controlled passages 54 in a manner well understood in the art. From the upper working chambers vent passages 55 extend through the inner part of the wall structure 16 and to the replenishing chamber so that collected air or gases may escape from the working chamber.

The ring structure 13 with the partition lugs 14 and 15 extending therefrom is held against rotary displacement within the housing by means of dowel pins 56 and 56'. The partition lugs have the bores or passageways 57 and 57' respectively therethrough, and the dowel pins 56 and 56' extend a distance into the inner ends of these bores and into holes 58 in the wall structure 11. Short dowel pins 59 are secured in the outer ends of the partition lug bores to project into the openings 60 in the inner part of the wall structure 16 so as to hold this wall structure 16 in proper position and alignment. The dowel pins 59 are bored so that the bores 57 and 57' in the partition lugs are in communication with the reservoir 53 to form extensions thereto and thus materially increase the capacity for replenishing fluid.

Any fluid which may be forced by the pressure to flow along the end of the shaft within the bearing extension 12 is intercepted by the annular groove 61 in the bearing extension around the shaft and flows through the passage 62 which communicates with the bore 63 through the upper dowel pin 56, the intercepted fluid being then conducted to the bore 57 in the upper partition lug and from there it is returned to the replenishing chamber 53.

An intercepting groove 64 in the wall structure 16 around the corresponding shaft end returns escaped fluid directly to the replenishing chamber 53 by way of the passage 65.

To prevent leakage to the exterior of the shock absorber from the replenishing chamber 53 a gasket 66 is applied in the peripheral channel 67 in the outer part of the wall structure 16 and a washer 68 is interposed between the clamping ring 17 and the gasket.

Posts 69 form an integral part of the wall structure 16 and are interposed at regular intervals between the inner and outer walls of the wall structure and serve to strengthen and protect the walls against the clamping pressure of the annular nut 17.

In the modified arrangement shown in Figure 7, the metering or compensating orifice 70 is provided in a thin disc 71 which is clamped between a seating washer 72 and a clamping ring 73. The valve plug 44 extends through this orifice and has the beveled surface 49. The seating washer 72 serves also as an abutment for the sleeve 36' in which the valve 40 is slidable against the resistance of the spring 42, the supporting head 34' being turned to bring the tube into abutment with the seating washer, as shown, whereafter the supporting head is turned back a certain distance for proper location of the valve plug 44 in the orifice 70 for fluid flow control during normal pressure conditions. If the orifice 70 is depended upon alone to meter the fluid flow its diameter will be greater than the diameter of the cylindrical inner end of the valve plug to form the annular fluid flow metering passageway, said passageway being increased when the valve is shifted inwardly to expose more or less of the beveled end 49 under excessive pressure conditions.

The orifice 70 could be of the same diameter as the valve plug so that the orifice will be closed under normal pressure conditions and the flow under such conditions controlled by an orifice 74 in the disc 71, additional flow passageway being provided under excess pressure conditions by inward shift of the valve and corresponding exposure of the orifice 70 to flow by the beveled end 49 of the valve plug. The arrangement could also be such that flow under normal pressure conditions would be both through the orifice 74 and through the orifice 70, and with increased passageway afforded through the orifice 70 upon inward movement of the valve by excess pressure.

It will be noted in the arrangement of Figure 7 that the bore 75 in the seating washer 72 forms an intermediate or expansion chamber in which fluid flow under pressure entering through the orifices may be relieved of a considerable part of its pressure energy before flowing out through the passages 28 and 28' to the low pressure working chambers. Such gradual relief of the orifice flow pressure will eliminate swishing or other noise which would tend to occur when fluid flow is under heavy pressure through a short restricted orifice.

I have shown practical and efficient embodiments of the various features of my invention, but I do not desire to be limited to the exact construction, arrangement and operation shown and described as changes and modifications may be made without departing from the spirit of the invention.

I claim as follows:

In a hydraulic shock absorber, means defining a passageway for the flow of displaced fluid, a seat member interposed in said passageway and having a frusto-conical opening therethrough, a cylindrical valve plug extending through said opening and arranged to move axially therein, said plug being of less diameter than the apex of said opening whereby to leave an annular orifice for which said opening apex provides a surrounding edge, said plug at its outer end being beveled, yielding means tending to hold said valve plug with its cylindrical end in said opening, excess pressure against said valve plug tending to shift it inwardly to expose its beveled end to said opening for increasing the size of said opening to thereby relieve the excess pressure, said beveled end causing a lateral pressure component against said plug whereby said plug will be held against one side of said opening and chattering thereof prevented.

RALPH F. PEO.